(12) United States Patent
Yang et al.

(10) Patent No.: US 7,450,327 B2
(45) Date of Patent: Nov. 11, 2008

(54) COHERENT SPIN VALVE AND RELATED DEVICES

(75) Inventors: Haitao Yang, San Jose, CA (US); Xiao-Dong Xiang, Danville, CA (US)

(73) Assignee: Intematix Corporation, Fremont, CA (US)

( * ) Notice: Subject to any disclaimer, the term of this patent is extended or adjusted under 35 U.S.C. 154(b) by 358 days.

(21) Appl. No.: 11/241,292

(22) Filed: Sep. 29, 2005

(65) Prior Publication Data

US 2006/0183002 A1  Aug. 17, 2006

Related U.S. Application Data

(60) Provisional application No. 60/614,946, filed on Sep. 30, 2004, provisional application No. 60/632,767, filed on Dec. 1, 2004.

(51) Int. Cl.
G11B 5/39 (2006.01)
(52) U.S. Cl. .................................................. 360/31
(58) Field of Classification Search .............. 360/313, 360/324.11; 365/158; 428/209
See application file for complete search history.

(56) References Cited

U.S. PATENT DOCUMENTS 5,695,858 A * 12/1997 Maeda et al. .............. 428/209
2006/0061916 A1 * 3/2006 Li et al. ................. 360/324.11
2007/0081276 A1 * 4/2007 Fukuzawa et al. ........... 360/313
2007/0188934 A1 * 8/2007 Meguro et al. ............. 360/313
2008/0043518 A1 * 2/2008 Schumacher ............... 365/158

* cited by examiner

Primary Examiner—Tianjie Chen
(74) Attorney, Agent, or Firm—Fliesler Meyer LLP

(57) ABSTRACT

Embodiments of the present invention are directed toward the field of spintronics, and in particular, systems and devices capable of performing spin coherent quantum logic operations. The inventive spin valve comprises two ferromagnetic electrode layers, and a non-magnetic conducting layer positioned therebetween. An external magnetic field $\vec{B}_0$ is applied in the Z direction, such that the two electrode layers are each magnetized in a direction substantially parallel to the external magnetic field. Rather than attempting to change the magnetization of one of the ferromagnetic layers, as is the case in prior art technologies, it is the direction of the electron spin that is manipulated in the present embodiments while the electron is traveling through the middle, nonmagnetic layer. One of the ferromagnetic electrodes may be the tip of a scanning tunneling microscope (STM). This configuration may further comprise a bias voltage source connected between the STM tip and the other ferromagnetic electrode, such that a spin polarized tunneling current is conducted between the two.

22 Claims, 7 Drawing Sheets (a)

(b)

COHERENT SPIN VALVE AND RELATED DEVICES

CROSS REFERENCES TO RELATED APPLICATIONS

The present application claims the benefit of U.S. Provisional Patent Application No. 60/614,946, by Haitao Yang and Xiao-Dong Xiang, titled "Coherent Spin Valve and Related Devices," filed Sep. 30, 2004. The present application also claims the benefit of U.S. Provisional Patent Application No. 60/632,767, by Haitao Yang and Xiao-Dong Xiang, also titled "Coherent Spin Valve and Related Devices," and filed Dec. 1, 2004. Both U.S. Provisional Patent Application 60/614,946 and 60/632,767 are hereby incorporated herein by reference in their entirety.

FIELD OF THE INVENTION

Embodiments of the present invention are generally related to the field of spintronics. In particular, the present embodiments are directed to systems and devices capable of performing spin coherent quantum logic operations.

BACKGROUND OF THE INVENTION

Recently, a new technology has emerged known as spintronics. Instead of conventional charge-based electronic devices, this technology uses electron spin to carry information, and thus offers opportunities for a new generation of spin devices. These devices will have the potential advantages of non-volatility, increased data processing speed, decreased electric power consumption, and increased integration densities compared with conventional semiconductor devices.

The giant magnetoresistance effect (GMR) was discovered in 1988, and is considered to be a very promising technology for spintronics devices. GMR is a quantum mechanical effect observed in layered magnetic thin-film structures composed of alternating layers of ferromagnetic and nonmagnetic layers. When the magnetizations of the ferromagnetic layers are parallel, the spin dependant scattering of carriers is minimized and the material has its lowest resistance; in contrast, when the magnetizations are anti-parallel, the spin dependant scattering of carriers is maximized and the material displays its highest resistance. The simplest GMR structure is the spin valve, which consists of two ferromagnetic layers sandwiching a thin nonmagnetic conductive layer. The flow of electrons in the spin valve is controlled by changing the direction of the magnetization of a part of the device. In previous spin valve structures, one of the two ferromagnetic layers was "pinned" by placing an anti-ferromagnetic layer in intimate contact with the pinned layer. The other ferromagnetic layer was "free" layer whose magnetization could be changed by applying an external magnetic field.

The basic principle GMR effect may be explained using a simple quantum mechanics picture, as illustrated in FIG. 1. In the ferromagnetic layers 10, 11A, the electron energy bands of spin up and spin down are split, which results in an unbalanced density of states for spin up and down at Fermi level $E_F$. In the middle nonmagnetic layer 12, the density of states for spin up and spin down are even. The conductivity of the GMR structure may be expressed as follows:

$$\sigma \propto n_{1\uparrow} n^2 n_{2\uparrow} + n_{1\downarrow} n^2 n_{2\downarrow} \qquad (1)$$

where n is the density of states of spin up or down in the nonmagnetic layer 12 at the Fermi level, $n_{1\uparrow}$, $n_{1\downarrow}$ is the density of states of spin up, spin down respectively in the left ferromagnetic electrode (10), and $n_{2\uparrow}$, $n_{2\downarrow}$ is that corresponding to the right ferromagnetic electrode (11A). In FIG. 1A, the magnetizations of the two electrodes (the two ferromagnetic layers 10, 11A) are all in the up direction (parallel); the spin up electrons are the majority carriers, and the spin down electrons are the minority carriers. The magnetization of electrode 11A is reversed to the state shown as electrode 11B in FIG. 1B, however, and the spin up, down electrons become the minority, majority carriers, respectively. Assuming $n_+$, $n_-$ as the density of states of for the majority, minority cases, respectively, the conductivity of parallel and anti-parallel structures may be written as:

$$\sigma_p \propto n^2(n_{1+}n_{2+} + n_{1-}n_{2-})$$

$$\sigma_{ap} \propto n^2(n_{1+}n_{2-} + n_{1-}n_{2+}) \qquad (2)$$

The spin polarization is defined as $P=(n_+-n_-)/(n_++n_-)$, and giant magnetoresistance is defined as $GMR=(\sigma_p-\sigma_{ap})/\sigma_{ap}$. From equation (2), one may derive:

$$GMR = \frac{2P_1 P_2}{1 - P_1 P_2} \qquad (3)$$

This is same as the Julliere formula for tunneling magnetoresistance.

SUMMARY OF THE INVENTION

In the present embodiments, a coherent electron spin resonance controlled spin valve device is implemented. The device utilizes a 3-layer sandwich structure, with two ferromagnetic electrode layers and a layer of nonmagnetic conductive material between the electrodes. The electron spin relaxation time of the nonmagnetic layer should be long relative to the conducting electron travel time inside this layer, such that the electron spin stay coherent when it moves from one electrode to another electrode. The spin polarized conduction current between two ferromagnetic electrodes is controlled by an RF or microwave "gate" pulse, which excites the electron spin resonance under a static magnetic field. Quantum phase oscillation behavior can be observed in direct-current conduction of the device as a function of RF (microwave) pulse duration.

In one embodiment of the present invention, the coherent spin valve comprises a nonmagnetic, electrically conducting layer positioned adjacent to a first ferromagnetic electrode and a second ferromagnetic electrode; a static magnetic field $\vec{B}_0$ configured to magnetize the first and second ferromagnetic electrodes, each direction of magnetization being substantially parallel to the static magnetic field $\vec{B}_0$; a radiation source for providing an RF/microwave signal to the nonmagnetic, electrically conducting layer, the RF/microwave signal having a magnetic field $\vec{B}_1$ which is substantially perpendicular to the a static magnetic field $\vec{B}_0$, and configured such that $\vec{B}_1$ and $\vec{B}_0$ interact with conducting electrons in the nonmagnetic layer to excite a precessing electron state having a spin resonance frequency, thus generating a spin polarized conducting current; and a detector for monitoring a change in the spin polarized conducting current. The signal from the RF/microwave radiation source in the coherent spin valve may be a a continuous wave (CW) signal, or a time varying signal.

In an alternative embodiment of the present invention, the first ferromagnetic electrode of the coherent spin valve comprises the tip of a scanning tunneling microscope (STM), and this configuration may include a bias voltage source connected between the STM tip and the second ferromagnetic electrode such that a spin polarized tunneling current is conducted between the STM tip and the second ferromagnetic electrode.

In an alternative embodiment of the present invention, a method of performing spintronics, is disclosed, the method comprising the steps of providing a nonmagnetic, electrically conducting layer positioned adjacent to a first ferromagnetic electrode and a second ferromagnetic electrode; providing a static magnetic field $\vec{B}_0$ to magnetize the first and second ferromagnetic electrodes, each direction of magnetization being substantially parallel to the static magnetic field $\vec{B}_0$; providing an RF/microwave signal to the nonmagnetic, electrically conducting layer, the RF/microwave signal having a magnetic field $\vec{B}_1$ which is substantially perpendicular to the a static magnetic field $\vec{B}_0$; interacting the magnetic fields $\vec{B}_1$ and $\vec{B}_0$ with conducting electrons in the nonmagnetic layer to excite a precessing electron state having a spin resonance frequency, thus generating a spin polarized conducting current; and detecting a change in the spin polarized conducting current. The method may be a spin coherent quantum logic operation, include a spin echo technique, and/or include a 2D Fourier transform electron spin resonance.

DETAILED DESCRIPTION OF THE INVENTION

In the following description of the various embodiments of the present invention, the basic structure will be described first, followed by an analysis of the Bloch equation as it pertains to the present embodiments. Next, various exemplary applications using the described principles will be provided, followed by a discussion of exemplary materials from which the middle nonmagnetic layer and the two ferromagnetic layers may be fabricated.

The Basic Structure

Figure 1:
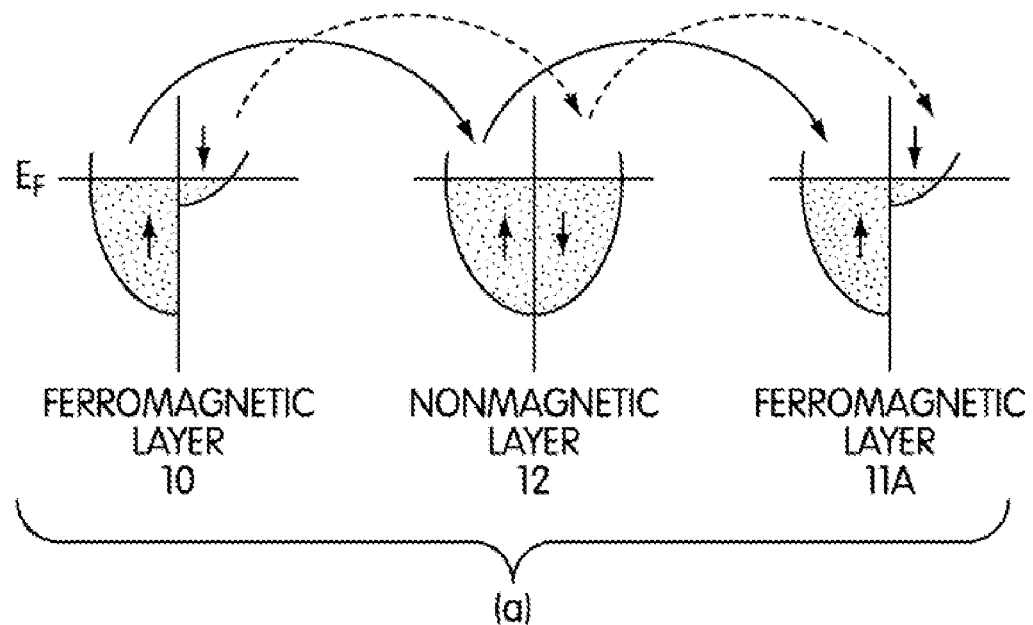
FIGS. 1A and 1B are a schematic diagrams of a simple quantum mechanics model for the GMR effect.
Figure 1:
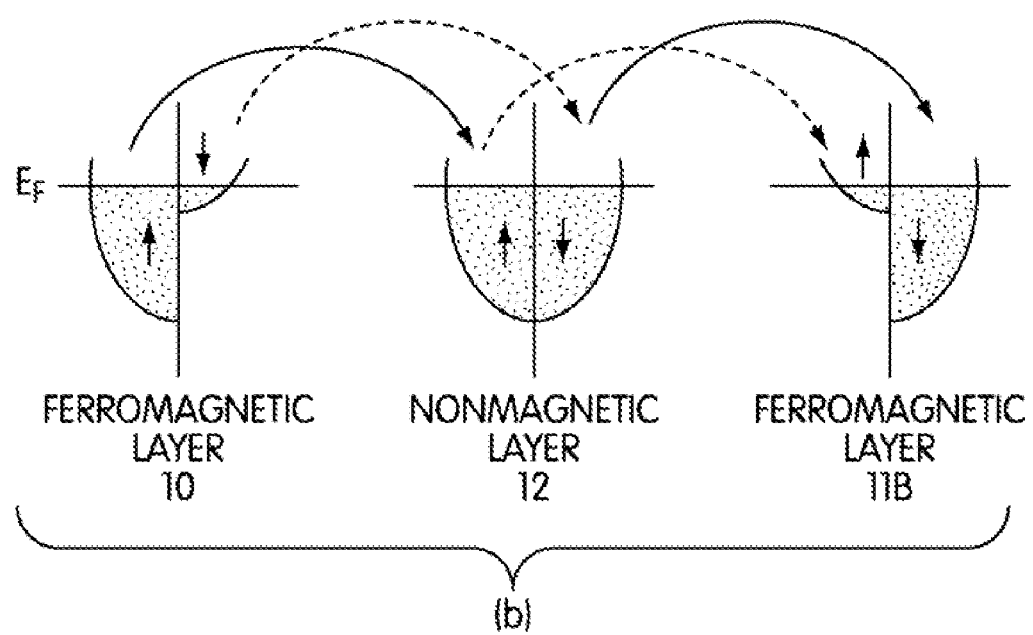
Figure 2:
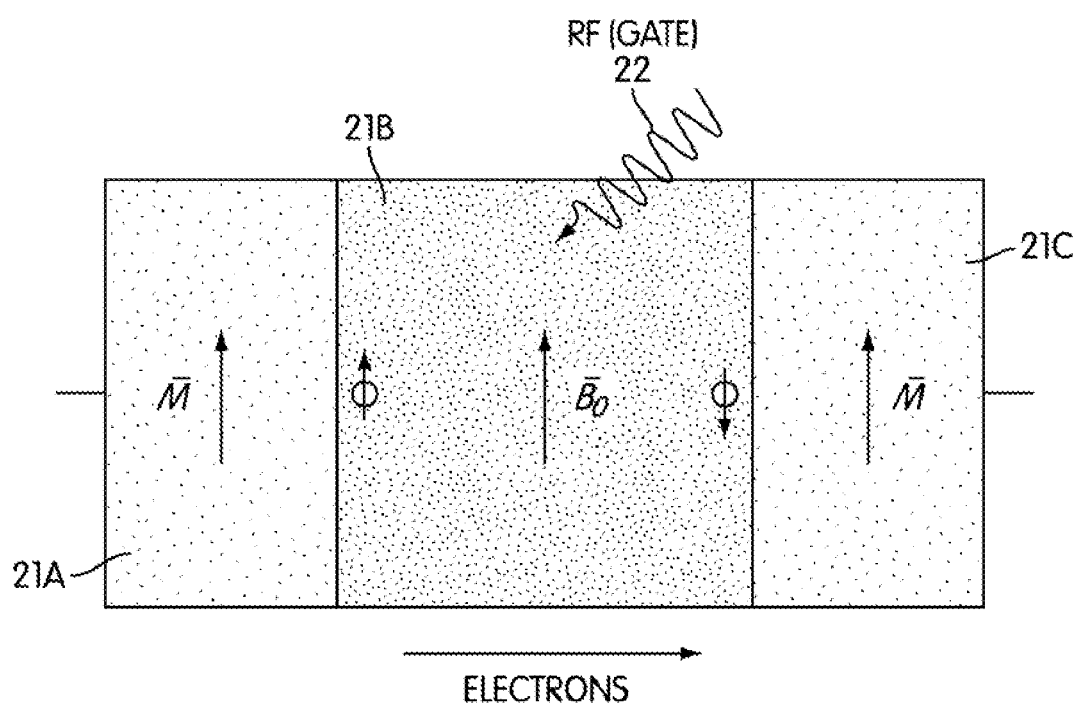
FIG. 2 shows the structure of a simple coherent spin valve.

The basic structure is illustrated in FIG. 2, which shows the inventive spin valve comprising two ferromagnetic electrode layers (layers 21A and 21C) and a non-magnetic conducting layer (layer 21B) positioned between the two ferromagnetic layers 21A, 21C. An external magnetic field $\vec{B}_0$ is applied in the Z direction, such that the two electrode layers 21A, 21C are each magnetized in a direction substantially parallel to the external magnetic field $\vec{B}_0$.

The inventive concept lies in the following principle: rather than attempting to change the magnetization of one of the ferromagnetic layers, as is the case in prior art technologies, in the present embodiments it is the direction of the electron spin that is manipulated while the electron is traveling through the middle, nonmagnetic layer 21B. The electrons are injected into layer 21B from layer 21A and move to layer 21C. Because the electrode layers are magnetized parallel to the direction of external magnetic field $\vec{B}_0$, the spin of the electrons ejected to the middle layer 21B from layer 21A are initially polarized in a direction parallel to $\vec{B}_0$. If the direction of the electron spin is maintained until the reaches the opposite end of the layer, the spin direction will be parallel to the magnetization direction of electrode 21C, and the device will yield a high conductivity. If the spin direction has been reversed during the transmission through layer 21B, however, the conductivity will be low.

The manipulation of electron spins may be realized using electron spin resonance techniques. The ferromagnetic layers 21A, 21C in the spin valve structure may be replaced by half metallic materials or semiconductor materials whose spin polarization is achieved by optical pumping or other polarization technologies. A radio frequency (RF) signal 22 may be applied to the layer 21B, where the RF signal 22 may be either a continuous wave (CW) or pulsed signal, such that the RF magnetic field $\vec{B}_1$ is perpendicular to the external magnetic field $\vec{B}_0$, and rotating around $\vec{B}_0$ in the Larmor frequency governed by the relationship $h\nu=g\mu_B B_0$. In this case, the polarized electrons injected from electrode 21A into the layer 21B will have a spin resonance, and the electron spins can precess both vertically and horizontally. Depending on the applied RF signal 22, the electron spins in the layer 21B can be manipulated to be at any state. A detailed analysis of the spin resonance assumed by the electrons is provided using the classic Bloch equation.

Bloch Equation Analysis

Assuming $\vec{B}_0$ is in the $\vec{e}_z$ direction: $\vec{B}_0 = B_0 \vec{e}_z$; and RF magnetic field $\vec{B}_1$ is initially along $\vec{e}_x$ and rotating around $\vec{B}_0$ clockwise in the angular velocity $\omega$:

$$\vec{B}_1 = \vec{e}_x B_1 \cos(\omega t) - \vec{e}_y B_1 \sin(\omega t)$$

The initial magnetic moment of electron spins is at its thermal equilibrium value $\vec{M}_0$ which is along $\vec{e}_z$ also: $\vec{M}_0 = M_0 \vec{e}_z$.

The spin movement under magnetic field is governed by Bloch equation:

$$\frac{d\vec{M}}{dt} = \gamma \vec{M} \times \vec{B} - (M_x \vec{e}_x + M_y \vec{e}_y)/T_2 + \vec{e}_z (M_0 - M_z)/T_1 \qquad (1)$$

where $\gamma$ is gyromagnetic ratio $\gamma = g\mu_B/\hbar$, and $\vec{B} = \vec{B}_0 + \vec{B}_1$. $T_1$ and $T_2$ are the spin-lattice and spin-spin relaxation times, respectively. Written in matrix form, equation (1) becomes:

$$\frac{d\vec{M}}{dt} = \Re \vec{M} + \vec{M}_0/T_1 \quad \text{and} \tag{2}$$

$$\Re = \begin{bmatrix} -1/T_2 & \gamma B_0 & \gamma B_1 \sin\omega t \\ -\gamma B_0 & -1/T_2 & \gamma B_1 \cos\omega t \\ -\gamma B_1 \sin\omega t & -\gamma B_1 \cos\omega t & -1/T_1 \end{bmatrix}, \tag{3}$$

$$\vec{M}_0 = \begin{pmatrix} 0 \\ 0 \\ M_0 \end{pmatrix}$$

By introducing a rotating reference frame which rotates around the Z axis clockwise, and with frequency ω, the Bloch equation can be greatly simplified. Defining $$\vec{M}' = U^{-1}\vec{M} \tag{4}$$

$U^{-1}$ is the anticlockwise transformation matrix:

$$U^{-1} = \begin{bmatrix} \cos\omega t & -\sin\omega t & 0 \\ \sin\omega t & \cos\omega t & 0 \\ 0 & 0 & 1 \end{bmatrix}$$

Substituting equation (4) into equation (2), the following equation is obtained:

$$\frac{d\vec{M}'}{dt} = \Theta \vec{M}' + \vec{M}_0/T_1 \quad \text{where} \tag{5}$$

$$\Theta = U^{-1}\Re U + \frac{dU^{-1}}{dt}U \tag{6}$$

$$= \begin{bmatrix} -1/T_2 & \Delta\omega & 0 \\ -\Delta\omega & -1/T_2 & \omega_1 \\ 0 & -\omega_1 & -1/T_1 \end{bmatrix}$$

and $\omega_0 = \gamma B_0$, $\omega_1 = \gamma B_1$, $\Delta\omega = \omega_0 - \omega$.

The solution to the differential equation (5) is:

$$\vec{M}'(t) = \exp(\Theta t)\vec{M}'_0 - \Theta^{-1}\vec{M}_0/T_1 \tag{7}$$

and $$\vec{M}'_0 = \vec{M}_0 + \Theta^{-1}\vec{M}_0/T_1$$

The calculation of $\exp(\Theta t)$ is very complicated. To simplify the calculation and get a rough picture, we assume that $T_1 = T_2 = \tau$, then, $$\exp(\Theta t) = \tag{8}$$

$$\frac{e^{-t/\tau}}{\omega_1'^2} \begin{bmatrix} \omega_1^2 + \Delta\omega^2 \cos\omega_1' t & \Delta\omega\omega_1' \sin\omega_1' t & \Delta\omega\omega_1(1-\cos\omega_1' t) \\ -\Delta\omega\omega_1' \sin\omega_1' t & \omega_1'^2 \cos\omega_1' t & \omega_1\omega_1' \sin\omega_1' t \\ \Delta\omega\omega_1(1-\cos\omega_1' t) & -\omega_1\omega_1' \sin\omega_1' t & \Delta\omega^2 + \omega_1^2 \cos\omega_1' t \end{bmatrix}$$

and $\omega_1'$ is defined as $\omega_1'^2 = \omega_1^2 + \Delta\omega^2$.

The spin moment in the rotating frame is then $$\vec{M}'(t) = \frac{M_0 \omega_1 \tau e^{-t/\tau}}{\sqrt{1+\omega_1'^2 \tau^2}} \begin{pmatrix} -\frac{\Delta\omega}{\omega_1'}\cos(\omega_1' t - \alpha) \\ \sin(\omega_1' t - \alpha) \\ \frac{\omega_1}{\omega_1'}\cos(\omega_1' t - \alpha) \end{pmatrix} + \frac{M_0}{1+\omega_1'^2 \tau^2}\begin{pmatrix} \Delta\omega\omega_1\tau^2 \\ \omega_1\tau \\ 1+\Delta\omega^2\tau^2 \end{pmatrix} \tag{9}$$

and the spin moment in the absolute frame is $$\vec{M}(t) = \frac{M_0 \omega_1 \tau e^{-t/\tau}}{\sqrt{1+\omega_1'^2 \tau^2}} \begin{pmatrix} \sin(\omega_1' t - \alpha)\sin\omega t - \frac{\Delta\omega}{\omega_1'}\cos(\omega_1' t - \alpha)\cos\omega t \\ \sin(\omega_1' t - \alpha)\cos\omega t + \frac{\Delta\omega}{\omega_1'}\cos(\omega_1' t - \alpha)\sin\omega t \\ \frac{\omega_1}{\omega_1'}\cos(\omega_1' t - \alpha) \end{pmatrix} + \tag{10}$$

$$\frac{M_0}{1+\omega_1'^2\tau^2}\begin{pmatrix} \omega_1\tau(\Delta\omega\tau\cos\omega t + \sin\omega t) \\ \omega_1\tau(\cos\omega t - \Delta\omega\tau\sin\omega t) \\ 1+\Delta\omega^2\tau^2 \end{pmatrix}$$

α is defined as $$\cos\alpha = \frac{\omega_1'\tau}{\sqrt{1+\omega_1'^2\tau^2}} \quad \text{and} \quad \sin\alpha = \frac{1}{\sqrt{1+\omega_1'^2\tau^2}}.$$

From equation (9), one skilled in the art will note that the spin moment in the rotating frame consists of two terms: a first oscillating decay term and a second constant term. The oscillating part of the spin moment in the rotating frame will decay to zero after a sufficient period of time, which leaves the constant portion of the spin moment as the final state in which the spin precessing is balanced with thermal relaxation.

The next part of the analysis considers the situation where the RF frequency ω is equal to the spin resonant frequency; i.e., $\Delta\omega = 0$ and $\omega'_1 = \omega_1$. Equation (9) then becomes:

$$\vec{M}'(t) = M_0 e^{-t/\tau}\cos\alpha\begin{pmatrix} 0 \\ \sin(\omega_1 t - \alpha) \\ \cos(\omega_1 t - \alpha) \end{pmatrix} + M_0 \sin\alpha\begin{pmatrix} 0 \\ \cos\alpha \\ \sin\alpha \end{pmatrix} \tag{11}$$

and α will become 0 if τ->∞ (in other words, if the relaxation time approaches an infinite length of time).

Figure 3:
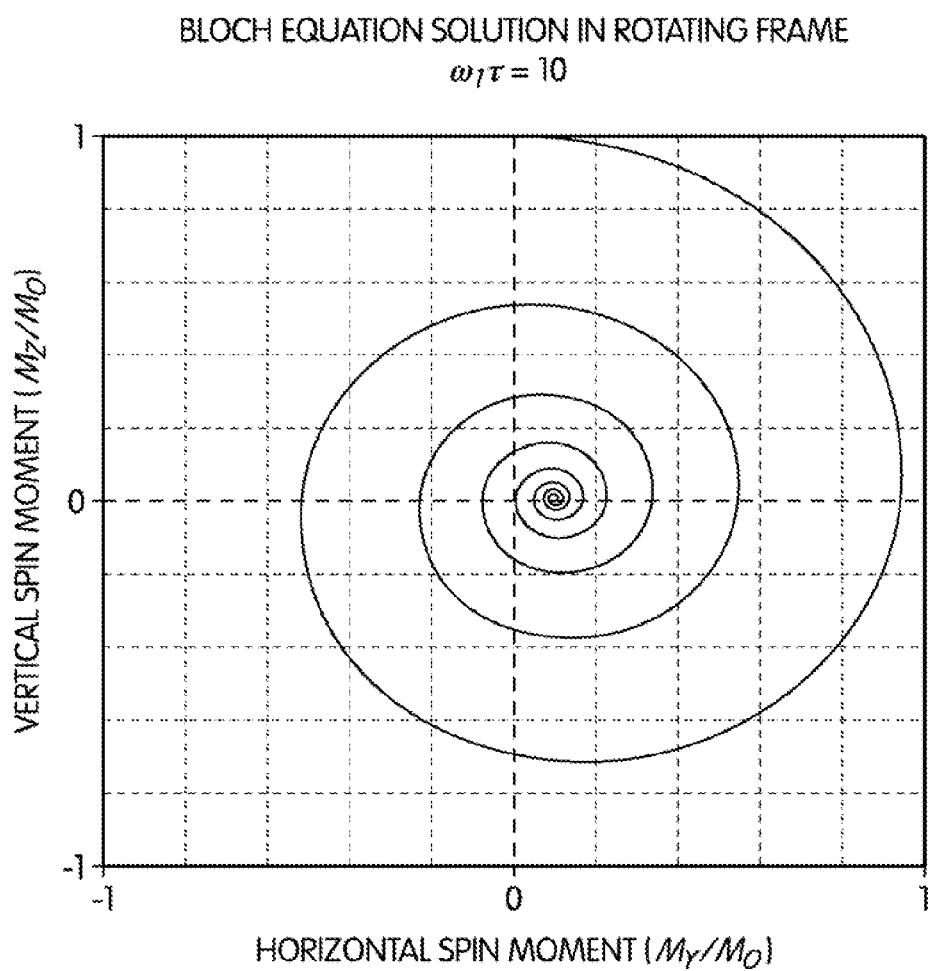
FIG. 3 is an illustration of electron spin evolution under the vertical magnetic field $\vec{B}_0$ and a horizontal rotating field $\vec{B}_1$, observed in $\vec{B}_1$ rotating frame.

The behavior of equation (11) is illustrated in FIG. 3. FIG. 3 is an illustration of the electron spin evolution under the vertical magnetic field $\vec{B}_0$ and a horizontal rotating field $\vec{B}_1$, observed in the $\vec{B}_1$ rotating time frame. The illustrated curve is calculated under the condition $\omega = \omega_0$ and $\omega_1\tau = 10$. If relaxation time τ is long enough, the spin moment is just simply rotating along the X axis with an angular velocity $\omega_1$, and where a decay is observed when the observation is made in the rotating frame.

Next, various exemplary applications using the presently described principles will be provided.

Exemplary Applications

From equation (11), one skilled in the art will note that the angle of the spin rotation along horizontal axis is $\omega_1 t$. By controlling the RF pulse time t or magnetic field $B_1$, the spin rotation angle may be manipulated, adjusted and/or controlled, and therefore the spin vertical and the horizontal components may also be manipulated, adjusted, and/or controlled. In this manner, the resistance of the spin valve may be adjusted.

Figure 4:
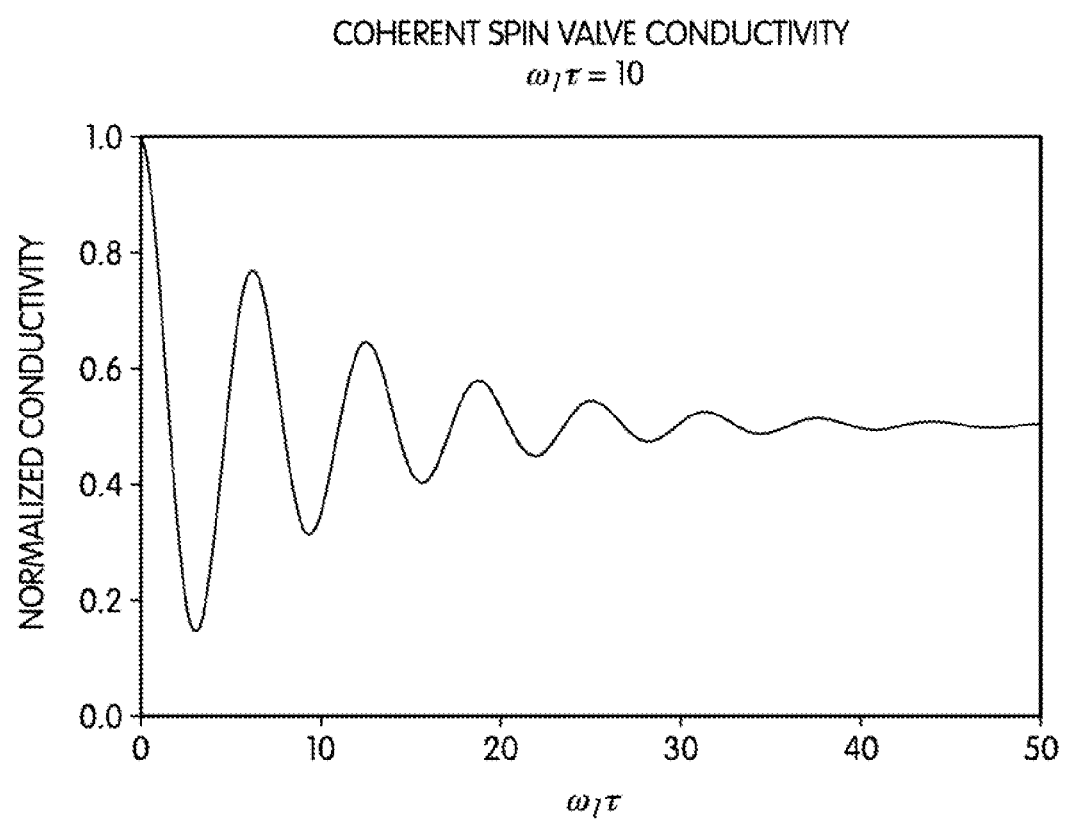
FIG. 4 is a coherent spin valve conductivity time resolve curve.

Based on the GMR principle, the spin valve conductance is actually determined by the Z component (parallel to the magnetization direction) of the electron spins that reach the interface between nonmagnetic layer 21B and the magnetic layer 21C. FIG. 4 gives an example of the decayed oscillation behavior of the spin valve conductance with respect to the RF pulse width, or a "coherent spin valve conductivity time resolve curve." The time is either the RF pulse duration or electron transporting time in the nonmagnetic layer 21B, whichever is shorter; in other words, time t is either the pulse width of the RF signal 22, or the electron transport time within the middle layer 21B if that transport time is shorter than the pulse width of the RF signal 22. The remaining conditions are the same as those of FIG. 3, including the condition that $\omega_1\tau=10$.

Figure 5:
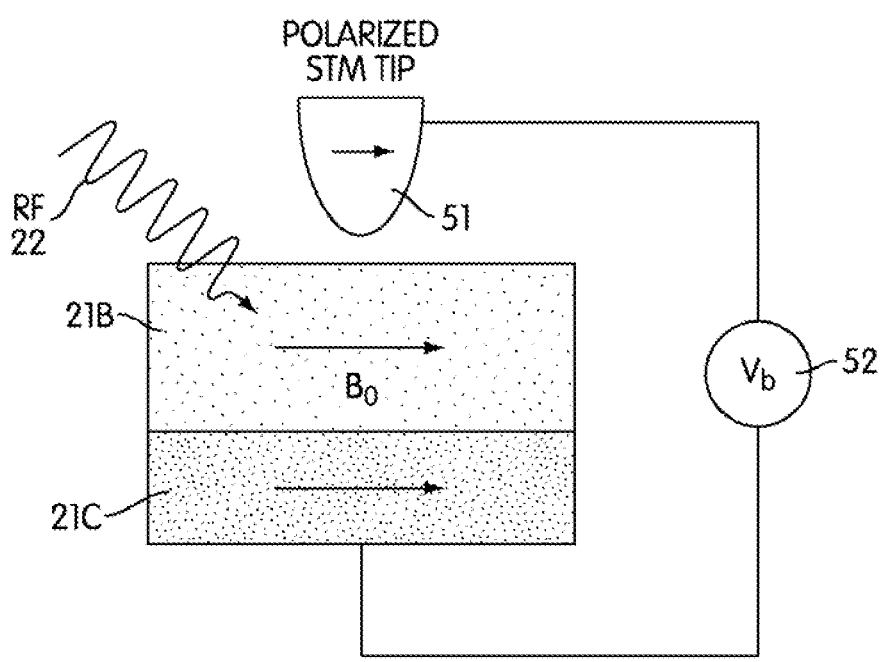
FIG. 5 is a modified coherent spin valve structure, where a polarized STM tip functions as one of the magnetic electrodes.

Another exemplary structure based on the scheme depicted in FIG. 2 may be based on the same principle is shown in FIG. 5, which illustrates the situation where one of the magnetic layers of the coherent spin valve (what may have been layer 21A in FIG. 2) has been replaced by a spin polarized scanning tunneling microscope (STM) tip 51. When a bias voltage 52 applied between the STM tip 51 and the magnetic layer 21C, a spin polarized tunneling current can occur between the STM tip 51 and the nonmagnetic middle layer 21B. The tunneled electrons may then be manipulated by RF pulses (again, by an RF signal 22) before the electrons reach the magnetic layer 21C. The structure in FIG. 5 makes it possible to carry out a single electron operation.

Conventional pulsed ESR techniques known in the art may be combined with the inventive coherent spin valve to enhance detection sensitivity, and add new functionality such as the spin echo technique, or 2D Fourier transform electron spin resonance. Although the spin valve resistance is not sensitive to horizontal spin components, which are perpendicular to the magnetization direction, a subsequent $\pi/2$ RF pulse will turn the horizontal spin components toward the vertical direction. This puts them in a condition that the spin valve can detect. In addition to the conventional $\pi/2$-t-$\pi$ RF pulse sequence in the spin echo technique, for example, a subsequent $\pi/2$ RF pulse is needed to enable the spin valve detection ($\pi/2$-$t_1$-$\pi$-$t_2$-$\pi/2$). The signal strength will be determined by the time in which the subsequent pulse is delayed from the spin echo pulse sequence ($t_2$), instead of the detection time in a conventional spin echo measurement. For 2D-FT-ESR measurement, a $\pi/2$-$t_1$-$\pi/2$-$\tau$-$\pi/2$-$t_2$-$\pi/2$ pulse sequence is useful.

The resistance (or conductance) of the spin valve is actually the direct result of a quantum interaction between the electron spins, the RF/microwave signal, and the external magnetic field. The embodiments and principles described herein actually comprise quantum computing device(s), where the RF signal is functions as a gate. The RF signal may be provided by an RF coil or micro-coil, micro-strip line, or RF resonator/cavity.

Figure 6:
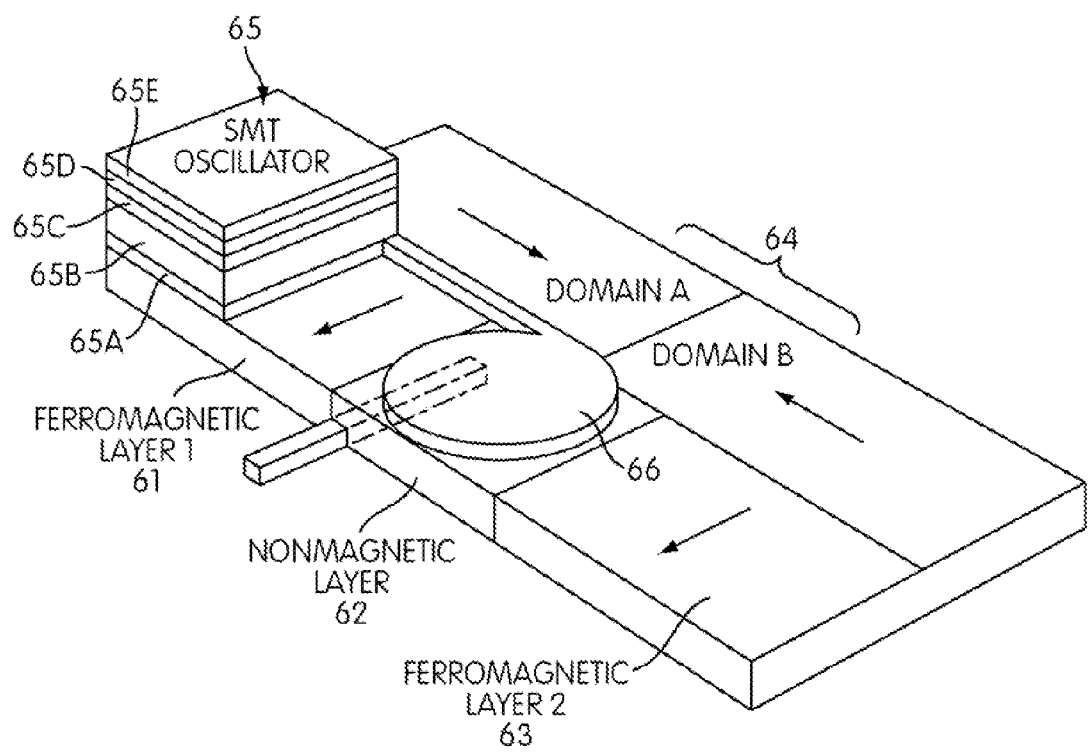
FIG. 6 is a schematic of a planar spin valve structure configured to provide a local magnetic field and an RF generator.

In some embodiments, the spin valve may be configured as planar structure. As illustrated in FIG. 6, the spin valve in this configuration comprises a ferromagnetic layer 61, nonmagnetic layer 62, and a ferromagnetic layer 63, each of which lie in a plane. The static magnetic field may be provided by a multi-domain magnetic nano-wire or similar structure, shown generally in FIG. 3 as a nano-structure 64 having domains A and B. The fringe field from the domain wall between domains A and B provides the static magnetic field to the nonmagnetic layer 62 of the spin valve. The direction of this fringe field is within the plane of the structure, and perpendicular to the direction that the current is flowing. The magnetization directions of the two ferromagnetic layers 61 and 63 of the spin valve are indicated in the FIG. 6.

If one of the ferromagnetic layers is pinned (say, for example, ferromagnetic layer 61), the magnetization of the second layer, in this case layer 63, is free to change. The free layer magnetization (in other words, the direction of the magnetization of the layer 63) will be aligned parallel to the fringe field. By switching the fringe field, the magnetization of the free ferromagnetic layer 63 can be easily switched. The switching of the fringe field can be achieved by controlling the domain wall position (the interface between domains A and B of the multi-domain magnetic structure 64) with electric current flowing through the domain wall. The switching of the free magnetic layer magnetization will add more function to the spin valve logic operation.

The RF source may be provided by a spin momentum transfer (SMT) oscillator 65 placed on top of the spin valve. The SMT 65 device may comprise a bottom electrode layer 65A, a fixed ferromagnetic layer 65B, a conductive layer 65C, a free ferromagnetic layer 65D, and a top electrode layer 65E, as illustrated in FIG. 6. When a DC current flows through the SMT device 65, an oscillation will result on top of the DC current. The oscillation frequency is in an RF or microwave frequency range, and it may be tuned by manipulating the level of the DC current. A micro-coil 66 is then connected to the bottom electrode 65A, which produces an oscillating magnetic field in the nonmagnetic layer 62 of the spin valve.

Figure 7:
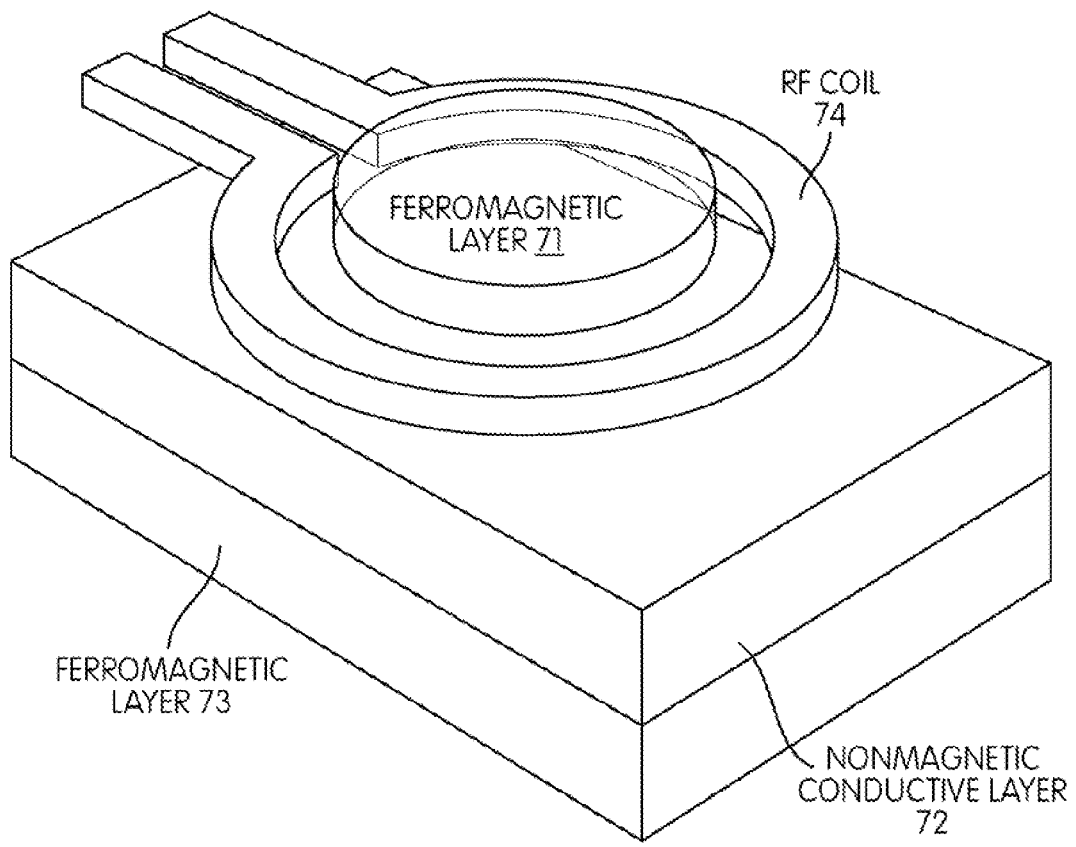
FIG. 7 is a schematic of a vertical structure spin valve with an RF source.

An SMT oscillator may also be used as the RF source in the generalized layered structure shown in FIG. 2. Such a configuration is shown in FIG. 7. The exemplary spin valve shown in FIG. 7 comprises a top ferromagnetic layer 71, which may be either the left or right layer originally shown in FIG. 2. In FIG. 2, the two ferromagnetic layers 21A, 21C were substantially the same size. In the alternative embodiment shown in FIG. 7, however, the top ferromagnetic layer 71 is configured to be smaller than either the middle, nonmagnetic conductive layer 72, or the bottom ferromagnetic layer 73, such that the RF field produced by SMT micro-coil 74 can penetrate into the nonmagnetic middle layer 72.

Materials

The materials from which the nonmagnetic layer of the spin valve nonmagnetic layer may be fabricated may either be semiconductive, or made from some conductive material featuring a long electron spin relaxation time. Graphite is one example.

The materials in the ferromagnetic layers may be ferromagnetic materials such as Co, half metallic materials with high spin polarization, such as $CrO_2$, $Sr_2FeMoO_6$ and $La_{1-x}Sr_xMnO_3$, dilute magnetic semiconductors such as (Ga, Mn)As and (Hg, Mn)Se, half Heusler alloys such as NiMnSb, $Mn_2VAl$, Heusler alloys such as $Ag_2MgCd$, $Ag_2MgIn$, $Ag_2MgZn$, $AuAgZn_2$, $AuCuZn_2$, $Ce_{14}Mg_{43}H_{43}$, $Ce_{25}Ag_{25}Cu_{25}In_{25}$, $Ce_2LaIn$, $CeAg_2In$, $CeAu_2In$, $CeCu_2In$, $Cr_{10}Mn_{15}Ni_{50}Sn_{25}$, $Cr_{15}Mn_{10}Ni_{50}Sn_{25}$, $CrCo_2Al$, $CrCo_2Ga$, $CrFe_2Al$, $CrFe_2Ga$, $CrNi_2Al$, $DyAg_2In$, $DyAu_2In$, $DyCu_2In$, $DyPd_2Bi$, $DyPd_2In$, $DyPd_2Pb$, $DyPd_2Sb$, $DyPd_2Sn$, $ErAg_2In$, $ErAu_2In$, $ErCu_2In$, $ErPd_2Bi$, $ErPd_2In$, $ErPd_2Pb$, $ErPd_2Sb$, $ErPd_2Sn$, $Fe_{21}Ni_9Si_{10}$, $Fe_2CoGa$, $Fe_2CoGe$, $Fe_2NiAl$, $Fe_2NiGa$, $Fe_9Co_6Ga_5$, $Fe_9Ni_6Ga_5$, $FeCo_2Al$, $FeCo_2Ga$, $FeCo_2Ge$, $FeCo_2In$, $FeCo_2Si$, $FeRu_2Si$, $FeRu_2Sn$, $GdAg_2In$, $GdAu_2In$, $GdCu_2In$, $GdPd_2Bi$, $GdPd_2In$, $GdPd_2Pb$, GdPd$_2$Sb, HfAu$_2$Al, HfAu$_2$In, HfCo$_2$Al, HfCo$_2$Ga, HfCo$_2$Sn, HfCu$_2$Al, HfNi$_2$Al, HfNi$_2$Ga, HfNi$_2$Sn, HoAg$_2$In, HoAu$_2$In, HoCu$_2$In, HoPd$_2$Bi, HoPd$_2$Pb, HoPd$_2$Sb, LaAg$_2$In, LaCu$_2$In, Li$_{20}$ZrAs$_8$, Li$_{20}$ZrBi$_8$, Li$_{20}$ZrP$_8$, Li$_{20}$ZrSb$_8$, Li$_{22}$Ti$_2$As$_{10}$, Li$_{22}$Ti$_2$Bi$_{10}$, Li$_{22}$Ti$_2$P$_{10}$, Li$_{22}$Ti$_2$Sb$_{10}$, Li$_{26}$HfAs$_{10}$, Li$_{26}$HfBi$_{10}$, Li$_{26}$HfSb$_{10}$, Li$_2$IrSn, Li$_2$MgIn, Li$_2$MgPb, Li$_2$MgTl, Li$_2$PdGe, Li$_2$PdPb, Li$_2$PdSn, Li$_2$PtSn, Li$_2$ZnGe, LiCo$_2$Ge, LiIrAl$_2$, LiIrGa$_2$, LiIrIn$_2$, LiMg$_2$Ga, LiMg$_2$Ge, LiNi$_2$Sn, LiPd$_2$Ge, LiPd$_2$Sn, LiPdAl$_2$, LiPdGa$_2$, LiPdIn$_2$, LiPtAl$_2$, LiPtGa$_2$, LiPtIn$_2$, LiRhAl$_2$, LiRhGa$_2$, LiRhIn$_2$, LiRuGa$_2$, LiRuIn$_2$, LuAu$_2$In, LuCu$_2$In, LuNi$_2$Sn, LuPd$_2$In, LuPd$_2$Sn, Mn$_{25}$Co$_{25}$Cu$_{25}$Sn$_{25}$, Mn$_{25}$Ni$_{25}$Cu$_{25}$Sn$_{25}$, Mn$_{25}$Ni$_{50}$In$_4$Sn$_{21}$, Mn$_{25}$Pd$_{20}$Cu$_{30}$Al$_{25}$, Mn$_{25}$Pd$_{50}$In$_{12}$Sb$_{13}$, Mn$_2$CoSn, Mn$_2$Cu$_4$InSn, Mn$_3$Cu$_3$Al$_2$, Mn$_3$Fe$_4$Ga$_9$, Mn$_4$Pd$_8$In$_{1.92}$Sn$_{2.08}$Cf$_{16}$, Mn$_4$Pd$_8$Sn$_{2.08}$Sb$_{1.92}$Cf$_{16}$, MnAu$_2$Al, MnCo$_2$Al, MnCo$_2$Ga, MnCo$_2$Ge, MnCo$_2$Sb, MnCo$_2$Si, MnCo$_2$Sn, MnCoSb, MnCu$_2$Al, MnCu$_2$In, MnCu$_2$Sb, MnCu$_2$Sn, MnFe$_2$Al, MnFe$_2$Si, MnNi$_2$Al, MnNi$_2$Ga, MnNi$_2$Ge, MnNi$_2$In, MnNi$_2$Sb, MnNi$_2$Sn, MnPd$_2$Al, MnPd$_2$Ge, MnPd$_2$In, MnPd$_2$Sb, MnPd$_2$Sn, MnPt$_2$Al, MnRh$_2$Ge, MnRh$_2$Pb, MnRh$_2$Sn, MoFe$_2$Al, NaLi$_2$Sb, NbCo$_2$Al, NbCo$_2$Ga, NbCo$_2$Sn, NbNi$_2$Al, NbNi$_2$Ga, NbNi$_2$Sn, NbRu$_2$Al, NdAg$_2$In, NdAu$_2$In, NdCu$_2$In, Ni$_2$CuSb, Ni$_2$CuSn, Ni$_2$MgIn, Ni$_2$MgSb, Ni$_2$MgSn, Ni$_6$Cu$_9$Sb$_5$, Ni$_6$Cu$_9$Sn$_5$, NiCu$_2$Sn, Pd$_2$MgGa, Pd$_2$MgIn, PrAg$_2$In, PrAu$_2$In, PrCu$_2$In, PrPd$_2$Bi, PrPd$_2$Pb, Rh$_2$CuSn, Rh$_2$NiSn, ScAg$_2$Al, ScAg$_2$Al, ScAg$_2$In, ScAu$_2$Al, ScAu$_2$In, ScCo$_2$Sn, ScCoNiSn, ScCu$_2$Al, ScCu$_2$Ga, ScCu$_2$In, ScNi$_2$Al, ScNi$_2$Ga, ScNi$_2$In, ScNi$_2$Sn, ScPd$_2$Al, ScPd$_2$Ga, ScPd$_2$In, ScPd$_2$Sn, ScPt$_2$In, ScPt$_2$Sn, SmAg$_2$In, SmAu$_2$In, SmCu$_2$In, SmPd$_2$Bi, SmPd$_2$Pb, TaCo$_2$Al, TbAg$_2$In, TbAu$_2$In, TbCu$_2$In, TbPd$_2$Bi, TbPd$_2$Pb, TbPd$_2$Sn, Ti$_{15}$Mn$_{10}$Ni$_{50}$Sn$_{25}$, Ti$_{25}$Fe$_{50}$Al$_{25}$, TiAu$_2$Al, TiAu$_2$In, TiCo$_2$Al, TiCo$_2$Ga, TiCo$_2$Ge, TiCo$_2$Si, TiCo$_2$Sn, TiCoNiSn, TiCu$_2$Al, TiCu$_2$In, TiFe$_2$Al, TiFe$_2$Ga, TiFe$_2$Sn, TiNi$_2$Al, TiNi$_2$Ga, TiNi$_2$In, TiNi$_2$Sb, TiNi$_2$Sn, TiPd$_2$In, TmAg$_2$In, TmAu$_2$In, TmCu$_2$In, TmPd$_2$In, TmPd$_2$Sn, UNi$_2$In, UNi$_2$Sn, V$_{15}$Mn$_{10}$Ni$_{50}$Sn$_{25}$, V$_{19}$Fe$_{56}$Si$_{25}$, V$_{25}$Fe$_{50}$Al$_{25}$, V$_{25}$Fe$_{50}$Si$_{25}$, V$_3$Fe$_{12}$Ge$_5$, V6Fe$_9$Ga$_5$, V$_9$Fe$_{21}$Si$_{10}$, VCo$_2$Al, VCo$_2$Ga, VCo$_2$Si, VCo$_2$Sn, VFe$_2$Al, VFe$_2$Ga, VFe$_2$Si, VFe$_2$Sn, VMn$_2$Al, VMn$_2$Ga, VMnCo$_4$Si$_2$, VMnFe$_4$Si$_2$, VNi$_2$Al, VNi$_2$Ga, VNi$_2$Sn, VRh$_2$Sn, WMn$_2$Sn, Y$_{0.25}$Ce$_{0.75}$Au$_2$In, Y$_{0.5}$Pr$_{0.5}$Mg$_3$, Y$_{25}$Pd$_{25}$Au$_{25}$In$_{25}$, Y$_2$Mg$_3$Zn$_3$, YAg$_2$In, YAu$_2$In, YCd$_3$, YCe$_3$Au$_8$In$_4$, YCu$_2$In, YLaMg$_6$, YPd$_2$Bi, YPd$_2$In, YPd$_2$Pb, YPd$_2$Sb, YPd$_2$Sn, YbAu$_2$In, YbNi$_2$Sn, YbPd$_2$Pb, YbPd$_2$Sb, YbPd$_2$Sn, ZrAu$_2$In, ZrCo$_2$Al, ZrCo$_2$Sn, ZrCu$_2$Al, ZrNi$_2$Al, ZrNi$_2$In, ZrNi$_2$Sb, ZrNi$_2$Sn, and ZrPt$_2$In.

To increase the spin injection efficiency between the ferromagnetic layer and the nonmagnetic layer in spin valve, a buffer layer may be inserted between the two. An example of a buffer layer is an oxide.

Many modifications of the exemplary embodiments of the invention discussed above may readily occur to those skilled in the art. Accordingly, the invention is to be construed as including all the structures and methods that fall within the scope of the appended claims.

What is claimed is:

1. A coherent spin valve comprising:
 a nonmagnetic, electrically conducting layer positioned adjacent to a first ferromagnetic electrode and a second ferromagnetic electrode;
 a static magnetic field $\vec{B}_0$ configured to magnetize the first and second ferromagnetic electrodes, each direction of magnetization being substantially parallel to the static magnetic field $\vec{B}_0$;
 a radiation source for providing an RF/microwave signal to the nonmagnetic, electrically conducting layer, the RF/microwave signal having a magnetic field $\vec{B}_1$ which is substantially perpendicular to the static magnetic field $\vec{B}_0$, and configured such that $\vec{B}_1$ and $\vec{B}_0$ interact with conducting electrons in the nonmagnetic layer to excite a precessing electron state having a spin resonance frequency, thus generating a spin polarized conducting current; and
 a detector for monitoring a change in the spin polarized conducting current.

2. The coherent spin valve of claim 1, wherein the signal from the RF/microwave radiation source is a continuous wave (CW) signal.

3. The coherent spin valve of claim 1, wherein the signal from the RF/microwave radiation source is a time varying signal.

4. The coherent spin valve of claim 3, wherein the time varying signal contains at least one pulse such that the excited electron spin precessing angle is controlled by adjusting the pulse width.

5. The coherent spin valve of claim 1, wherein the RF/microwave radiation source is selected from the group consisting of an RF coil, a micro-coil, a micro-strip line, or an RF cavity.

6. The coherent spin valve of claim 1, wherein the RF/microwave radiation source is a spin momentum transfer (SMT) oscillator.

7. The coherent spin valve of claim 1, wherein the first ferromagnetic electrode comprises the tip of a scanning tunneling microscope (STM).

8. The coherent spin valve of claim 7, further including a bias voltage source connected between the STM tip and the second ferromagnetic electrode, such that a spin polarized tunneling current is conducted between the STM tip and the second ferromagnetic electrode.

9. The coherent spin valve of claim 8, wherein the tunneling current is controlled to allow substantially single electron operation.

10. The coherent spin valve of claim 1, wherein the nonmagnetic, electrically conducting layer, the first ferromagnetic electrode, and the second ferromagnetic electrode are co-planar.

11. The coherent spin valve of claim 10, wherein the static magnetic field $\vec{B}_0$ is provided by a multi-domain magnetic nano-wire structure.

12. The coherent spin valve of claim 11, wherein the direction of magnetization of the first ferromagnetic electrode is pinned, and the direction of magnetization of the second ferromagnetic electrode is free to change.

13. The coherent spin valve of claim 1, wherein at least one of the ferromagnetic electrodes is Co.

14. The coherent spin valve of claim 1, wherein at least one of the ferromagnetic layers is a half metallic material.

15. The coherent spin valve of claim 14, wherein the half metallic material is selected from the group consisting of CrO$_2$, Sr$_2$FeMoO$_6$, La$_{1-x}$Sr$_x$MnO$_3$, NiMnSb, Mn$_2$VAl, Ag$_2$MgCd, Ag$_2$MgIn, Ag$_2$MgZn, AuAgZn$_2$, AuCuZn$_2$, Ce$_{14}$Mg$_{43}$H$_{43}$, Ce$_{25}$Ag$_{25}$Cu$_{25}$In$_{25}$, Ce$_2$LaIn, CeAg$_2$In, CeAu$_2$In, CeCu$_2$In, Cr$_{10}$Mn$_{15}$Ni$_{50}$Sn$_{25}$, Cr$_{15}$Mn$_{10}$Ni$_{50}$Sn$_{25}$, $CrCo_2Al$, $CrCo_2Ga$, $CrFe_2Al$, $CrFe_2Ga$, $CrNi_2Al$, $DyAg_2In$, $DyAu_2In$, $DyCu_2In$, $DyPd_2Bi$, $DyPd_2In$, $DyPd_2Pb$, $DyPd_2Sb$, $DyPd_2Sn$, $ErAg_2In$, $ErAu_2In$, $ErCu_2In$, $ErPd_2Bi$, $ErPd_2In$, $ErPd_2Pb$, $ErPd_2Sb$, $ErPd_2Sn$, $Fe_{21}Ni_9Si_{10}$, $Fe_2CoGa$, $Fe_2CoGe$, $Fe_2NiAl$, $Fe_2NiGa$, $Fe_9Co_6Ga_5$, $Fe_9Ni_6Ga_5$, $FeCo_2Al$, $FeCo_2Ga$, $FeCo_2Ge$, $FeCo_2In$, $FeCo_2Si$, $FeRu_2Si$, $FeRu_2Sn$, $GdAg_2In$, $GdAu_2In$, $GdCu_2In$, $GdPd_2Bi$, $GdPd_2In$, $GdPd_2Pb$, $GdPd_2Sb$, $HfAu_2Al$, $HfAu_2In$, $HfCo_2Al$, $HfCo_2Ga$, $HfCo_2Sn$, $HfCu_2Al$, $HfNi_2Al$, $HfNi_2Ga$, $HfNi_2Sn$, $HoAg_2In$, $HoAu_2In$, $HoCu_2In$, $HoPd_2Bi$, $HoPd_2Pb$, $HoPd_2Sb$, $LaAg_2In$, $LaCu_2In$, $Li_{20}ZrAs_8$, $Li_{20}ZrBi_8$, $Li_{20}ZrP_8$, $Li_{20}ZrSb_8$, $Li_{22}Ti_2As_{10}$, $Li_{22}Ti_2Bi_{10}$, $Li_{22}Ti_2P_{10}$, $Li_{22}Ti_2Sb_{10}$, $Li_{26}HfAs_{10}$, $Li_{26}HfBi_{10}$, $Li_{26}HfSb_{10}$, $Li_2IrSn$, $Li_2MgIn$, $Li_2MgPb$, $Li_2MgTl$, $Li_2PdGe$, $Li_2PdPb$, $Li_2PdSn$, $Li_2PtSn$, $Li_2ZnGe$, $LiCo_2Ge$, $LiIrAl_2$, $LiIrGa_2$, $LiIrIn_2$, $LiMg_2Ga$, $LiMg_2Ge$, $LiNi_2Sn$, $LiPd_2Ge$, $LiPd_2Sn$, $LiPdAl_2$, $LiPdGa_2$, $LiPdIn_2$, $LiPtAl_2$, $LiPtGa_2$, $LiPtIn_2$, $LiRhAl_2$, $LiRhGa_2$, $LiRhIn_2$, $LiRuGa_2$, $LiRuIn_2$, $LuAu_2In$, $LuCu_2In$, $LuNi_2Sn$, $LuPd_2In$, $LuPd_2Sn$, $Mn_{25}Co_{25}Cu_{25}Sn_{25}$, $Mn_{25}Ni_{25}Cu_{25}Sn_{25}$, $Mn_{25}Ni_{50}In_4Sn_{21}$, $Mn_{25}Pd_{20}Cu_{30}Al_{25}$, $Mn_{25}Pd_{50}In_{12}Sb_{13}$, $Mn_2CoSn$, $Mn_2Cu_4InSn$, $Mn_3Cu_3Al_2$, $Mn_3Fe_4Ga_9$, $Mn_4Pd_8In_{1.92}Sn_{2.08}Cf_{16}$, $Mn_4Pd_8Sn_{2.08}Sb_{1.92}Cf_{16}$, $MnAu_2Al$, $MnCo_2Al$, $MnCo_2Ga$, $MnCo_2Ge$, $MnCo_2Sb$, $MnCo_2Si$, $MnCo_2Sn$, $MnCoSb$, $MnCu_2Al$, $MnCu_2In$, $MnCu_2Sb$, $MnCu_2Sn$, $MnFe_2Al$, $MnFe_2Si$, $MnNi_2Al$, $MnNi_2Ga$, $MnNi_2Ge$, $MnNi_2In$, $MnNi_2Sb$, $MnNi_2Sn$, $MnPd_2Al$, $MnPd_2Ge$, $MnPd_2In$, $MnPd_2Sb$, $MnPd_2Sn$, $MnPt_2Al$, $MnRh_2Ge$, $MnRh_2Pb$, $MnRh_2Sn$, $MoFe_2Al$, $NaLi_2Sb$, $NbCo_2Al$, $NbCo_2Ga$, $NbCo_2Sn$, $NbNi_2Al$, $NbNi_2Ga$, $NbNi_2Sn$, $NbRu_2Al$, $NdAg_2In$, $NdAu_2In$, $NdCu_2In$, $Ni_2CuSb$, $Ni_2CuSn$, $Ni_2MgIn$, $Ni_2MgSb$, $Ni_2MgSn$, $Ni_6Cu_9Sb_5$, $Ni_6Cu_9Sn_5$, $NiCu_2Sn$, $Pd_2MgGa$, $Pd_2MgIn$, $PrAg_2In$, $PrAu_2In$, $PrCu_2In$, $PrPd_2Bi$, $PrPd_2Pb$, $Rh_2CuSn$, $Rh_2NiSn$, $ScAg_2Al$, $ScAg_2In$, $ScAu_2Al$, $ScAu_2In$, $ScCo_2Sn$, $ScCoNiSn$, $ScCu_2Al$, $ScCu_2Ga$, $ScCu_2In$, $ScNi_2Al$, $ScNi_2Ga$, $ScNi_2In$, $ScNi_2Sn$, $ScPd_2Al$, $ScPd_2Ga$, $ScPd_2In$, $ScPd_2Sn$, $ScPt_2In$, $ScPt_2Sn$, $SmAg_2In$, $SmAu_2In$, $SmCu_2In$, $SmPd_2Bi$, $SmPd_2Pb$, $TaCo_2Al$, $TbAg_2In$, $TbAu_2In$, $TbCu_2In$, $TbPd_2Bi$, $TbPd_2Pb$, $TbPd_2Sn$, $Ti_{15}Mn_{10}Ni_{50}Sn_{25}$, $Ti_{25}Fe_{50}Al_{25}$, $TiAu_2Al$, $TiAu_2In$, $TiCo_2Al$, $TiCo_2Ga$, $TiCo_2Ge$, $TiCo_2Si$, $TiCo_2Sn$, $TiCoNiSn$, $TiCu_2Al$, $TiCu_2In$, $TiFe_2Al$, $TiFe_2Ga$, $TiFe_2Sn$, $TiNi_2Al$, $TiNi_2Ga$, $TiNi_2In$, $TiNi_2Sb$, $TiNi_2Sn$, $TiPd_2In$, $TmAg_2In$, $TmAu_2In$, $TmCu_2In$, $TmPd_2In$, $TmPd_2Sn$, $UNi_2In$, $UNi_2Sn$, $V_{15}Mn_{10}Ni_{50}Sn_{25}$, $V_{19}Fe_{56}Si_{25}$, $V_{25}Fe_{50}Al_{25}$, $V_{25}Fe_{50}Si_{25}$, $V_3Fe_{12}Ge_5$, $V6Fe_9Ga_5$, $V_9Fe_{21}Si_{10}$, $VCo_2Al$, $VCo_2Ga$, $VCo_2Si$, $VCo_2Sn$, $VFe_2Al$, $VFe_2Ga$, $VFe_2Si$, $VFe_2Sn$, $VMn_2Al$, $VMn_2Ga$, $VMnCo_4Si_2$, $VMnFe_4Si_2$, $VNi_2Al$, $VNi_2Ga$, $VNi_2Sn$, $VRh_2Sn$, $WMn_2Sn$, $Y_{0.25}Ce_{0.75}Au_2In$, $Y_{0.5}Pr_{0.5}Mg_3$, $Y_{25}Pd_{25}Au_{25}In_{25}$, $Y_2Mg_3Zn_3$, $Y\ Ag_2In$, $YAu_2In$, $YCd_3$, $YCe_3Au_8In_4$, $YCu_2In$, $YLaMg_6$, $YPd_2Bi$, $YPd_2In$, $YPd_2Pb$, $YPd_2Sb$, $YPd_2Sn$, $YbAu_2In$, $YbNi_2Sn$, $YbPd_2Pb$, $YbPd_2Sb$, $YbPd_2Sn$, $ZrAu_2In$, $ZrCo_2Al$, $ZrCo_2Sn$, $ZrCu_2Al$, $ZrNi_2Al$, $ZrNi_2In$, $ZrNi_2Sb$, $ZrNi_2Sn$, and $ZrPt_2In$.

16. The coherent spin valve of claim 1, wherein at least one of the ferromagnetic electrodes is a semiconductor.

17. The coherent spin valve of claim 16, wherein the semiconductor is selected from the group consisting of (Ga, Mn)As and (Hg, Mn)Se.

18. The coherent spin valve of claim 16, wherein the semiconductor is spin polarized by optical pumping.

19. The coherent spin valve of claim 1, wherein the nonmagnetic, electrically conducting layer material is a semiconductor.

20. The coherent spin valve of claim 19, wherein the nonmagnetic, electrically conductive layer is graphite.

21. The coherent spin valve of claim 1, further including a buffer layer between the nonmagnetic, electrically conducting layer and at least one of the ferromagnetic electrodes, the buffer layer configured to increase the spin injection efficiency.

22. The coherent spin valve of claim 21, wherein the buffer layer is an oxide.

* * * * *